W. B. Harris.
Collar.

No. 54,720.         Patented May 15, 1866.

Witnesses:         Inventor:
R. C. Harris         Wm. B. Harris.
J. H. Harris

UNITED STATES PATENT OFFICE.

WILLIAM B. HARRIS, OF SPRINGFIELD, MASSACHUSETTS.

IMPROVEMENT IN PAPER COLLARS.

Specification forming part of Letters Patent No. 54,720, dated May 15, 1866.

*To all whom it may concern:*

Be it known that I, WILLIAM B. HARRIS, of Springfield, in the county of Hampden, in the State of Massachusetts, have invented a new and useful Improvement in Paper Collars; and I do hereby declare that the following is a full and exact description thereof, reference being had to the accompanying drawings, forming part of this specification, representing an extended collar with notched ends and lengthened button-holes, also its different positions as it is being fastened around the neck of the wearer, and its self-adjustment thereto.

This improvement consists of notches or slits made in the ends of the collar and the lengthened button-holes or slits, as represented by Figure 1.

Figs. 2 and 3 represent the collar buttoned on, with the notched ends placed in the button-holes, one outside, the other inside, forming a leverage which prevents the upper edge of the collar from being turned inward, thus obviating that tightening and cutting of the edge on the neck which is so annoying to the wearer, also preventing the soiling and lopping of the collar from perspiration by keeping it from resting against the neck.

Figs. 2 and 3 also represent the manner in which the lengthened button-holes or slits allow the collar to adjust itself to the size of the neck and necktie by the slipping of the notches either way along the same, thus lengthening or shortening the collar to the required size, while it still remains securely buttoned to the shirt.

Figure 1:
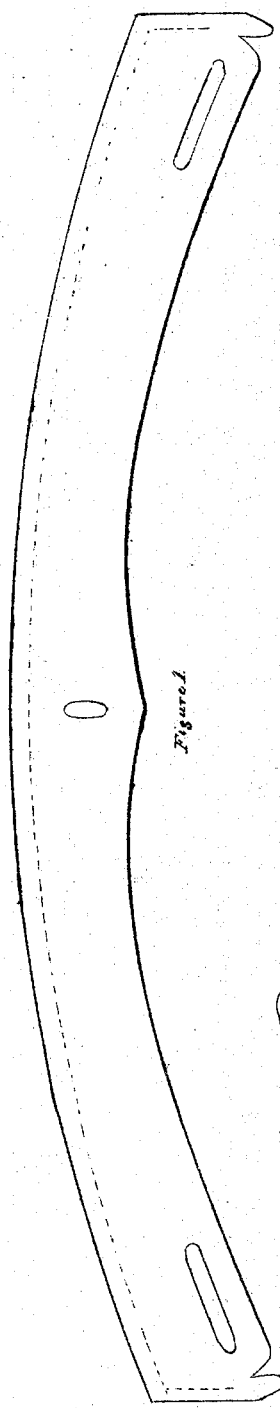
Figure 2:
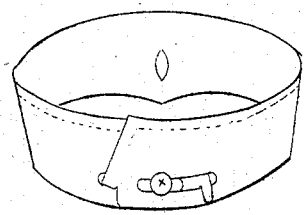
Figure 3:
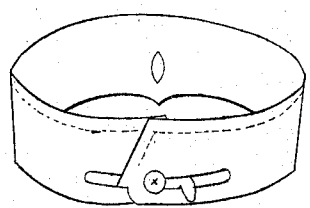
Figure 4:
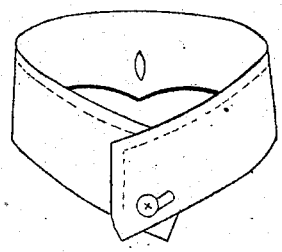
Fig. 4 represents the position that the collars now in use assume by turning on the button. My improvement entirely obviates this difficulty.
Figure 5:
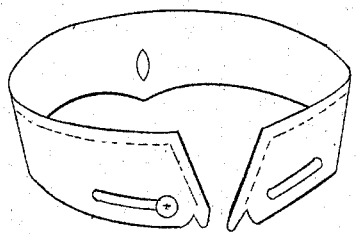
Figs. 5 and 6 are only intended to represent the collar in its different positions while being buttoned on, showing an easy way of doing the same to those unaccustomed to it.
Figure 6:
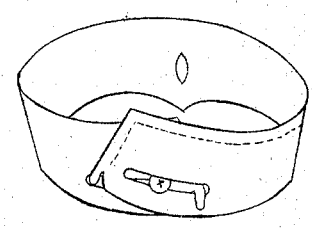

What I claim as my invention, and desire to secure by Letters Patent, is—

The notches or slits in the ends of the collar and the lengthened button-holes or slits, arranged in such a manner that when the notches are placed in the lengthened button-holes or slits they will prevent the upper edge of the collar from turning in toward the neck, and by slipping along the button-holes allow the collar to adjust itself exactly to the neck, as herein described.

WM. B. HARRIS.

Witnesses:
R. E. HARRIS,
F. H. HARRIS.